US007961235B2

(12) United States Patent
Silverstein

(10) Patent No.: US 7,961,235 B2
(45) Date of Patent: Jun. 14, 2011

(54) IMAGING APPARATUSES, IMAGE DATA PROCESSING METHODS, AND ARTICLES OF MANUFACTURE

(75) Inventor: D. Amnon Silverstein, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1332 days.

(21) Appl. No.: 10/698,926

(22) Filed: Oct. 31, 2003

(65) Prior Publication Data

US 2005/0094006 A1 May 5, 2005

(51) Int. Cl.
*H04N 3/14* (2006.01)
(52) U.S. Cl. ........................................ 348/294
(58) Field of Classification Search .......... 348/274, 348/275, 273, 272, 219.1, 218.1, 264, 335, 348/266; 396/530; 257/776–778, 225, 686; 250/226, 208.1
See application file for complete search history.

(56) References Cited

U.S. PATENT DOCUMENTS

| | | | | |
|---|---|---|---|---|
| 3,717,724 A | * | 2/1973 | Montgomery, III | 348/272 |
| 3,942,154 A | * | 3/1976 | Akami et al. | 382/111 |
| 4,765,564 A | * | 8/1988 | Colvocoresses | 244/3.16 |
| 5,442,394 A | * | 8/1995 | Lee | 348/264 |
| 5,760,832 A | * | 6/1998 | Yamanaka et al. | 348/264 |
| 5,965,875 A | * | 10/1999 | Merrill | 250/226 |
| 6,429,953 B1 | * | 8/2002 | Feng | 358/520 |
| 6,529,239 B1 | | 3/2003 | Dyck et al. | |
| 6,570,613 B1 | * | 5/2003 | Howell | 348/219.1 |
| 7,511,866 B2 | * | 3/2009 | Feng | 358/514 |
| 2002/0190254 A1 | | 12/2002 | Turner et al. | |
| 2003/0184869 A1 | | 10/2003 | Lee et al. | |
| 2004/0178465 A1 | * | 9/2004 | Merrill et al. | 257/440 |

FOREIGN PATENT DOCUMENTS

| | | |
|---|---|---|
| EP | 0476421 | 3/1992 |
| EP | 1067780 | 1/2001 |
| EP | 1173029 | 1/2002 |
| WO | WO01/99431 | 12/2001 |
| WO | WO 01/99431 A2 * | 12/2001 |

OTHER PUBLICATIONS

Ron Kimmel, "Demosaicing: Image Reconstruction from Color CCD Samples", IEEE Trans. on Image Processing, 8(9): 1221-8, Oct. 5, 1999.
Sugawara M et al—Ultrahigh-Definition Video System With 4000 Scanning Lines—SMPTE Motion Imaging Journal vol. 112 No. 10/11—Oct. 26, 2003—pp. 339-346.

* cited by examiner

*Primary Examiner* — Jason Chan
*Assistant Examiner* — Gary C Vieaux

(57) ABSTRACT

Imaging apparatuses, image data processing methods, and articles of manufacture are described. In one aspect, an imaging apparatus including an image sensor having a plurality of color sensor arrays is described. Individual sensor arrays include a plurality of sensors configured to provide image data for a plurality of pixels of a respective color component at an initial resolution. The plurality of color sensor arrays overlap and are offset with respect to one another to define a plurality of sub-pixels for individual ones of the pixels. The imaging apparatus includes processing circuitry configured to access the image data for at least one pixel from each of the plurality of color sensor arrays, and using the accessed image data, to determine sub-pixel image data for the respective sub-pixels to form an image of an increased resolution compared with the initial resolution of the color sensor arrays.

20 Claims, 5 Drawing Sheets

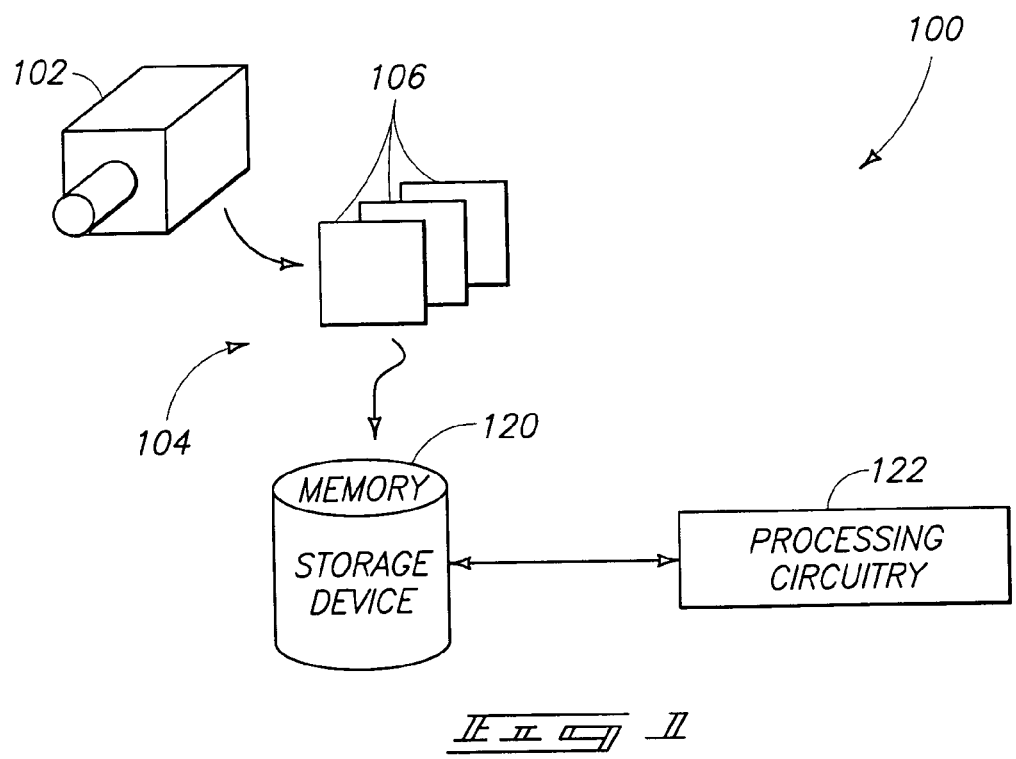
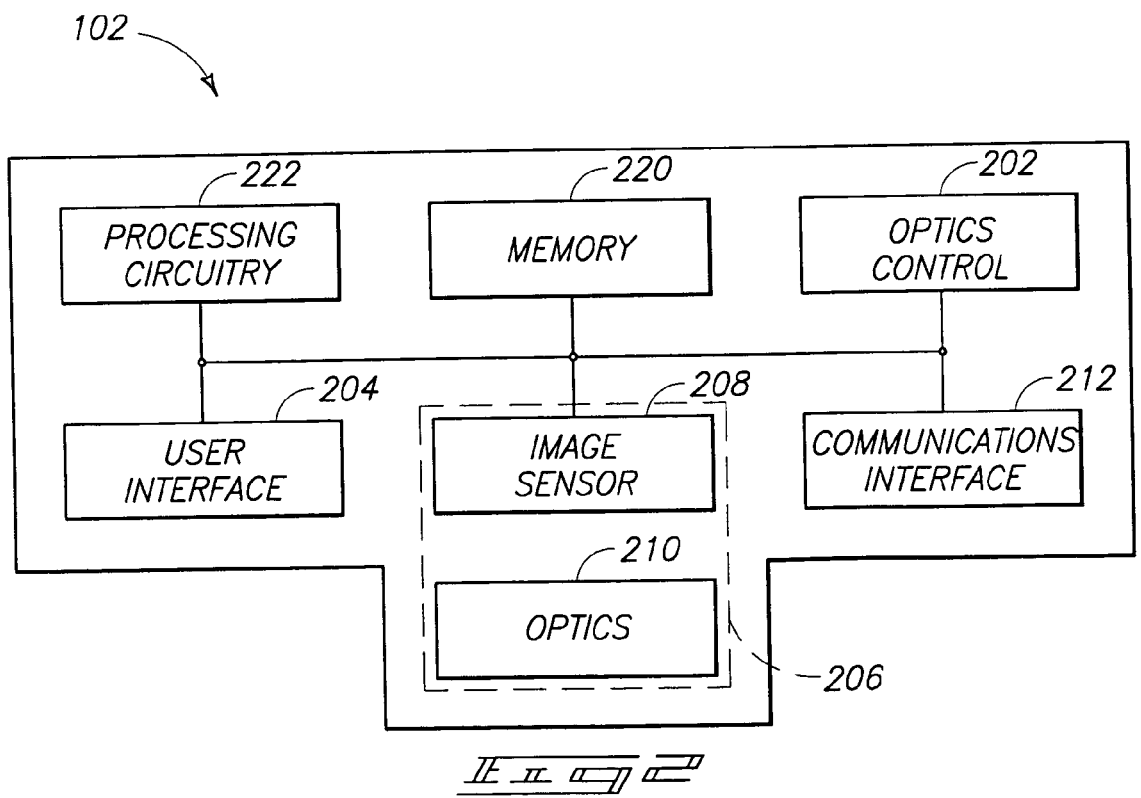

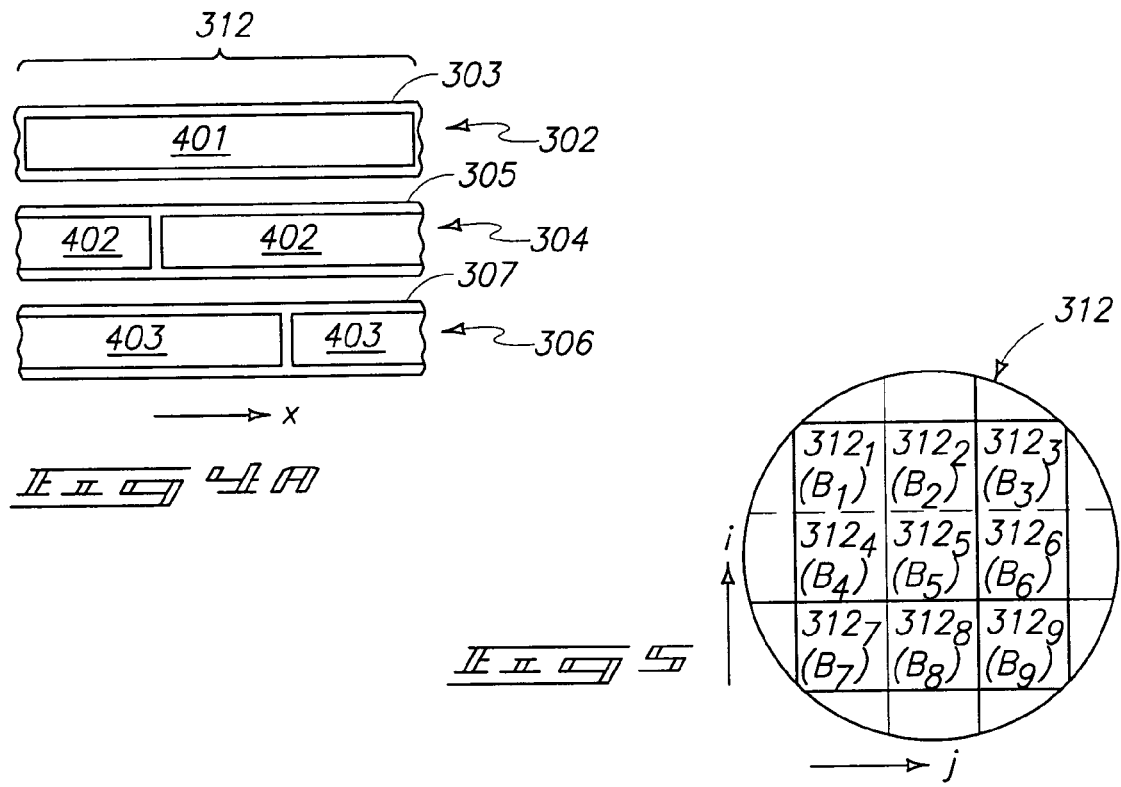
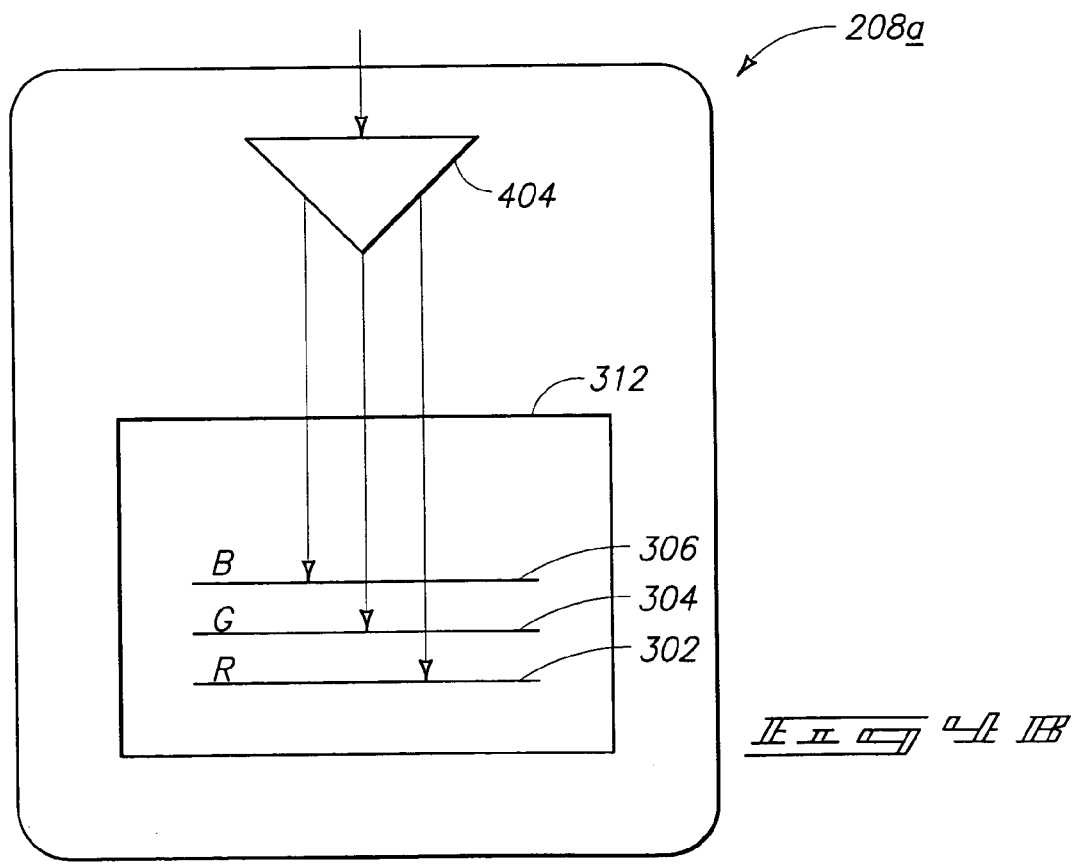

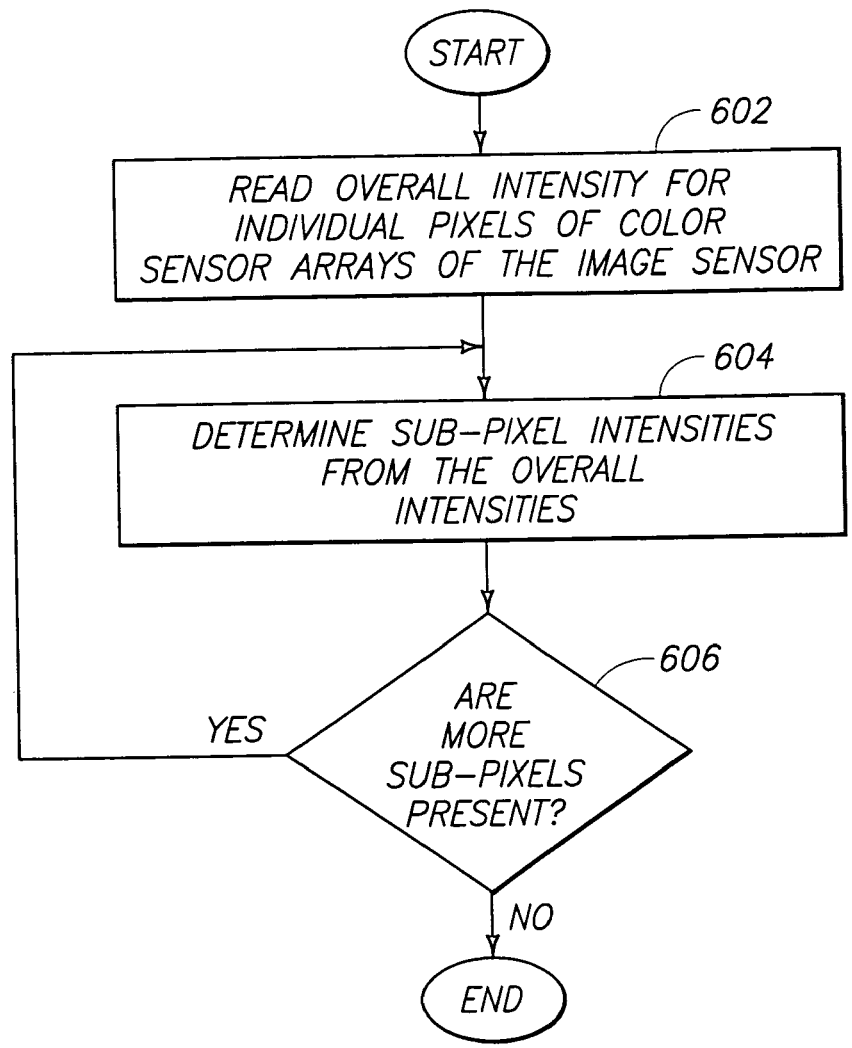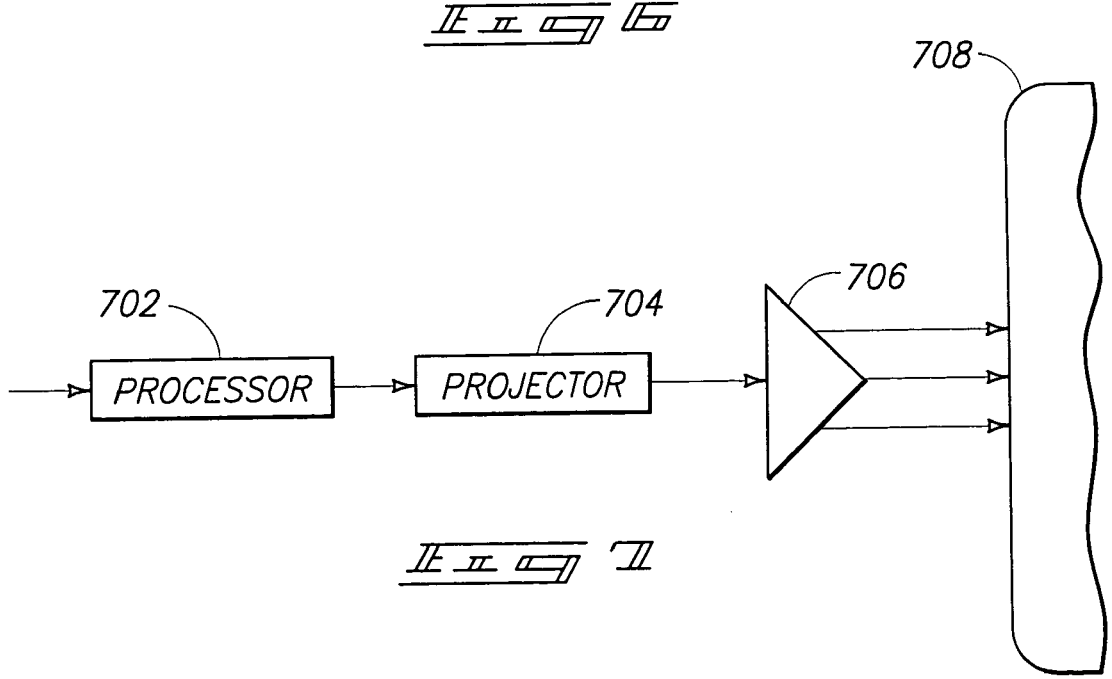

IMAGING APPARATUSES, IMAGE DATA PROCESSING METHODS, AND ARTICLES OF MANUFACTURE

FIELD OF THE INVENTION

At least some embodiments of the invention relate to imaging apparatuses, image data processing methods, and articles of manufacture.

BACKGROUND OF THE INVENTION

Digital imaging devices are becoming increasingly popular for still and video imaging operations. Numerous advancements for these devices have been made including increased resolutions and improved processing speeds. However, some digital video imaging device configurations are limited in resolution and framerate, in part, because of limited bandwidth available for accessing digital image data from an imaging sensor. One possible bottleneck in the data acquisition of some sensor configurations is the analog-to-digital conversion operations.

In color electronic imaging, digital images are typically captured with either full color at each pixel, or a mosaic of different color sensors with a single color at each pixel. In the mosaic approach, the incoming image may be resolved into three color channels and demosaiced. Interpolation of neighboring pixels is performed to determine red, green, blue (R, G, B) values or other color space values at each point on an image.

In the full color approach, each sensor pixel may include a layered structure with photodetectors for detecting R, G, B color components stacked within respective layers of individual pixels—each photodetector is tuned to capture a corresponding respective color component. Disadvantages of the mosaic approach include color aliasing which leads to objectionable color patterns on objects, while disadvantages of the full color approach include complex processing of full color image data.

At least some embodiments of the present invention relate to imaging apparatuses, image data processing methods, and articles of manufacture which provide improved digital imaging.

SUMMARY OF THE INVENTION

At least some embodiments of the invention relate to imaging apparatuses, image data processing methods, and articles of manufacture.

In one aspect, an imaging apparatus includes an image sensor having a plurality of color sensor arrays is described. Individual sensor arrays include a plurality of sensor elements configured to provide image data for a plurality of pixels of a respective color component at an initial resolution. The plurality of color sensor arrays overlap and are offset with respect to one another to define a plurality of sub-pixels for individual ones of the pixels. The imaging apparatus includes processing circuitry configured to access the image data for at least one pixel from each of the plurality of color sensor arrays, and using the accessed image data, to determine sub-pixel image data for the respective sub-pixels to form an image of an increased resolution compared with the initial resolution of the color sensor arrays.

In another aspect, an image data processing method is disclosed. The method comprises providing image data using an image sensor, and the providing comprising configuring a plurality of color sensor arrays to overlap one another in an offset relationship to define a plurality of sub-pixels for individual ones of a plurality of pixels, wherein individual sensor arrays comprise a plurality of sensor elements configured to provide the image data for the plurality of pixels of a respective color component at an initial resolution, and accessing the image data for at least one pixel from each of the plurality of color sensor arrays. The image data processing method further comprises forming an image having an increased resolution compared with the initial resolution using the accessed image data.

Other aspects of the invention are disclosed herein as is apparent from the following description and figures.

DESCRIPTION OF THE DRAWINGS

FIG. 1 is an illustrative representation of an imaging apparatus according to one embodiment.

FIG. 2 is a functional block diagram of an imaging device according to one embodiment.

FIG. 4A shows details of an individual pixel of a color sensor array shown in FIG. 3A according to one embodiment.

FIG. 4B is a schematic to achieve offsetting of color sensor arrays according to one embodiment.

FIG. 5 shows details of sub-pixels of an individual pixel shown in FIG. 3A according to one embodiment.

FIG. 6 is a flow chart of a methodology executable by processing circuitry of an imaging device according to one embodiment.

FIG. 7 is a functional block diagram for displaying a high resolution image according to one embodiment.

DETAILED DESCRIPTION OF THE INVENTION

Figure 3:
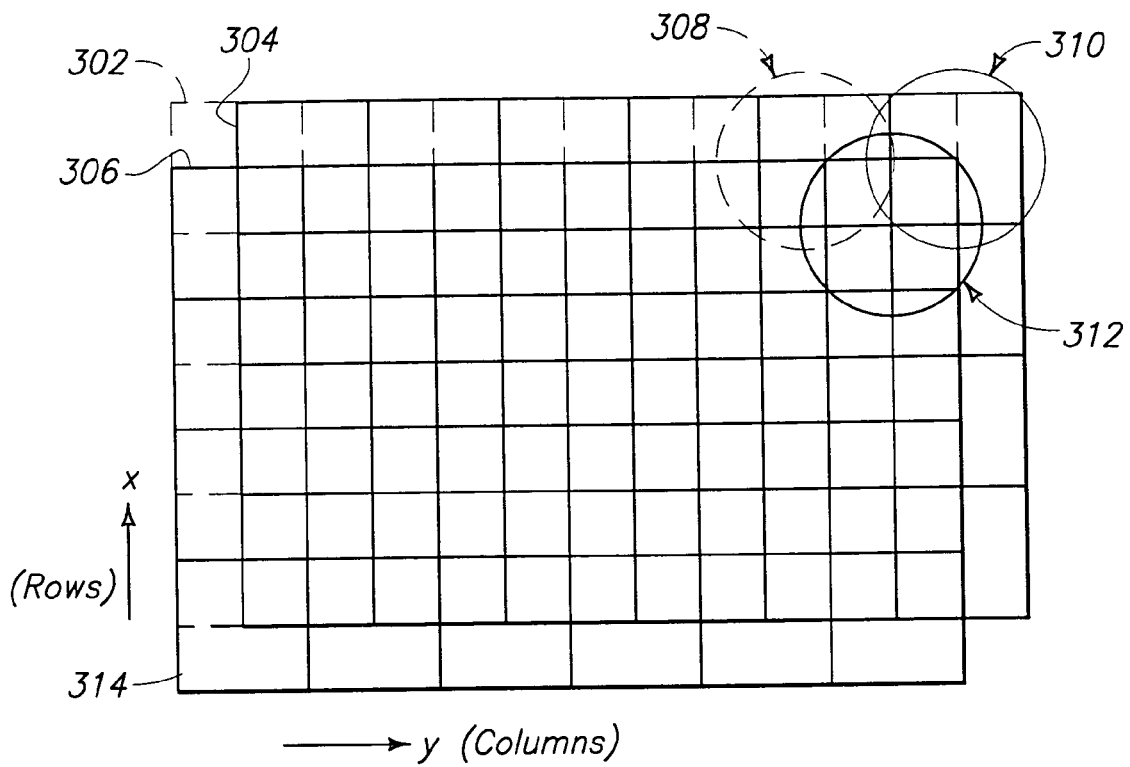
FIGS. 3-3A show exemplary configurations of color sensor arrays of the image sensor shown in FIG. 2 according to respective embodiments.

Referring to FIG. 1, an imaging apparatus 100 according to one exemplary embodiment is illustrated. Imaging apparatus 100 includes an imaging device 102, such as a digital video camera, configured to obtain image data 104. Image data 104 includes a plurality of frame images or frames 106 comprising a raster of digital data obtained during imaging operations. The image data may comprise red, green, and blue color components in one exemplary RGB implementation. Individual frames 106 may also include luminance, chrominance or other digital information, for a plurality of pixels in a raster in other embodiments. Other color spaces or representations of digital color may be used.

The illustrated configuration of apparatus 100 further includes a memory 120 and processing circuitry 122. Memory 120 is configured to receive and store image data 104. Exemplary memory may be implemented as hard disk memory, random access memory, read only memory, flash memory or other memory arrangements for storing digital data.

Processing circuitry 122 is arranged to process image data 104. Exemplary processing operations of processing circuitry 122 are described in detail below. Processing circuitry 122 may be arranged to execute programming instructions (e.g., software, hardware, etc.) to process image data 104. Accordingly, in such arrangements, processing circuitry 122 may be implemented as a microprocessor of a notebook computer, personal computer, workstation or other digital processing arrangement. Processing circuitry 122 may also comprise a field programmable gate array or any other hardware or software configuration capable of processing digital data of the obtained image data 104 as described herein.

Memory 120 and processing circuitry 122 are depicted externally of imaging device 102 and separate from one another in the exemplary configuration. In other possible embodiments, memory 120 and processing circuitry 122 may be embodied within a single device, such as a computer or workstation. In another possible embodiment, memory 120 or processing circuitry 122 may be arranged within imaging device 102. Other configurations of imaging apparatus 100 are possible.

Referring to FIG. 2, an exemplary embodiment of an imaging device 102 is shown. The imaging device 102 includes a memory 220, processing circuitry 222, an optics control 202, a user interface, 204, an imaging system 206 (including an image sensor 208 and optics 210 in the exemplary embodiment) and communications interface 212. In an exemplary multi-layered type image sensor 208 capable of sensing red, green and blue light components at individual pixel locations, each layer may include an image sensor for sensing light of a respective color component. Other sensors may be used including for example a sensor to sense intensity information in conjunction with a mosaic filter. The illustrated exemplary imaging system 206 is configured to provide raw digital image data in a plurality of frames. The raw digital image data comprises digital data corresponding to a plurality of pixels formed by image sensor 208.

Processing circuitry 222 is implemented as a microcontroller in an exemplary configuration. Processing circuitry 222 is configured to execute instructions to control operations of device 102 and the generation of image data. Alternatively, processing circuitry 222 may be completely implemented in hardware. Additionally, processing circuitry 222 may control operations of user interface 204 including controlling display of information using user interface 204 and processing of input data received via user interface 204.

Processing of image data may be performed by processing circuitry 122 or 222 after the image data is captured and quantized (or otherwise digitized). Exemplary processing of image data is described with respect to processing circuitry 122 in the described embodiment. In one example, overall intensities of select individual pixels of a color sensor array are measured, and calculation of sub-pixel intensities is implemented by the processing circuitry 122 as described below. Other exemplary processing of the image data includes interpolation by processing circuitry 122 to provide full color information, for example, to fully populate red, green, and blue information in respective arrays 302, 304, and 306 (FIG. 3).

Processing circuitry 122 may also operate to convert image data from one format to another format. Formats refer to different color spaces (RGB, CMY, CMYK, CMYG, HSB, CIELAB, YCC, etc.) or other representations of color measurement or specification. In an exemplary RGB embodiment, processing circuitry 122 may operate to convert RGB image data to a luminance or chrominance space. In another embodiment, the format conversion operations may be omitted and the original image data (e.g., RGB data) may be utilized.

Memory 220 is arranged to store digital information and instructions. Memory 220 may include a buffer configured to receive raw image data from image sensor 208 and to store such data for processing. Memory 220 may be embodied as random access memory (RAM), read only memory (ROM), flash memory or another configuration capable of storing digital information including image data, instructions (e.g., software or firmware instructions utilized by processing circuitry 222), or any other digital data desired to be stored within device 102.

Memory of apparatus 100, device 102 or other memory includes one or more processor-usable medium configured to store executable instructions (e.g., software, firmware or other appropriate processor-usable code or programming). Processor-usable media includes any article of manufacture which can contain, store, or maintain programming for use by or in connection with an instruction execution system including processing circuitry 122 or 222 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette such as a floppy diskette, zip disk, hard drive, random access memory, read only memory, flash memory, erasable programmable read only memory, compact disk, or other configurations capable of storing programming.

Image sensor 208 is configured to generate image data 104 comprising frames 106 responsive to received light. As described further below, image sensor 208 may comprise a plurality of sensor arrays individually configured to provide image data or image data values for a plurality of pixels of a respective color (e.g., red, green, or blue) component. In one embodiment, individual sensor arrays may comprise a plurality of sensor elements for a plurality of pixels or pixel locations arranged in a plurality of rows and columns configured to provide image data for the respective color component. Image data provided by one of the sensor arrays may be referred to as a data array for the respective color component. Accordingly, the frames 106 may individually include image data in the form of a plurality of data arrays for respective colors and provided by respective ones of the sensor arrays of the image sensor 208. Image sensor 208 may additionally include A/D converters to convert received analog signals corresponding to sensed light into digital image data.

In one embodiment, image sensor 208 is configured to permit independent querying of image data of one or more pixels of the image sensor 208 separate from other pixels of the sensor 208. For example, at a given time instant, any desired or chosen subset of pixels may be read. Sensor 208 may comprise an X3 sensor available from Foveon, Inc. in one embodiment.

Color information of individual pixels of color sensor arrays (e.g., numerals 302, 304, 306 of FIGS. 3-3A) may be read from the image sensor 208. The image sensor 208 may be configured to implement downsampling, if desired, to provide low resolution image data wherein data is read from less a total number of pixels of a color sensor array. Further, an individual pixel of a color sensor array (e.g., 302, 304, 306 of FIGS. 3-3A) may include color information of a plurality of colors, and the individual colors may additionally be independently queried or alternately queried with other color information in alternate embodiments.

Optics control 202 controls focus operations, zoom operations, or other desired operations of optics 210. In one embodiment, optics control 202 includes a plurality of motors (not shown) which are controlled by the processing circuitry 222.

Figure 3A:
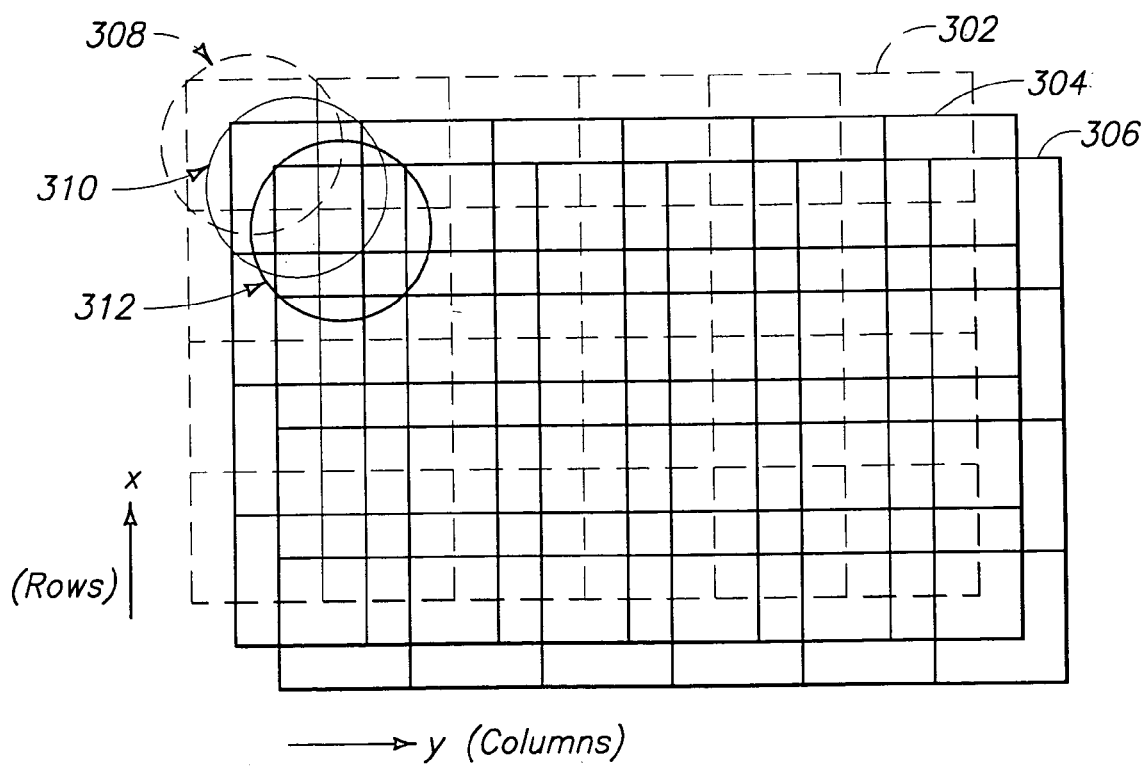

FIGS. 3-3A show exemplary configurations of the red, green, and blue color sensor arrays 302, 304, 306, respectively, which may be provided by the image sensor 208. Individual red, green, and blue color sensor arrays 302, 304, and 306, respectively, include image data for a plurality of pixels of a respective color component. For example, the red array 302 includes a plurality of red pixels 308, the green array 304 includes a plurality of green pixels 310, and the blue array 306 includes a plurality of blue pixels 312. In one embodiment, the red, green, and blue sensor arrays 302, 304, 306, respectively, are arranged to overlap one another. The red, green, and blue sensor arrays 302, 304, 306, respectively, are also offset with respect to one another such that a plurality of sub-pixels are formed or defined within individual pixels 308, 310, 312, respectively. For example, offsetting the arrays 302, 304, 306 with respect to one another provides a plurality of image data values for at least one color component for a single pixel location.

In one embodiment, three overlapping sensor arrays are created with a different offset for each color component. In the exemplary configuration shown in FIG. 3, the green array 304 is overlapped on the red array 302, but shifted (e.g., a distance equal to one-half of a pixel) to the right of the red array 302. The blue array 306 is overlapped on the red and green arrays, 302, 304, but shifted in a downward direction (e.g., by half a pixel) with respect to the red and green arrays 302, 304, respectively. In the exemplary overlapping configuration shown in FIG. 3, every quarter sub-pixel corresponds to three unique pixels in a sensor array.

In another exemplary configuration of color sensor arrays shown in FIG. 3A, a three-way overlapping of the color sensor arrays 302, 304, 306 is shown. For example, the three-way overlapping of the color sensor arrays 302, 304, 306 produces 9 sub-pixels in select individual pixels (e.g., blue pixel 312). Sub-pixels of the blue pixel 312 are generally identified as $312_1$-$312_9$ as illustrated in FIG. 5. It will be appreciated that the number of sub-pixels formed in an individual pixel may be more or less than the number of sub-pixels shown in the exemplary FIGS. 3 and 3A. The number of sub-pixels within an individual pixel may be determined by the number of color sensor arrays involved in the overlap and also the overlapping arrangement of the color sensor arrays.

Referring to FIG. 4A, an exemplary image sensor 208 comprising overlapped offset arrays 302, 304, 306 is shown. The multi-layered image sensor 208 may be configured to capture three colors (R, G, B). Each layer (e.g., 303, 305, 307) has image sensor or detector elements 401, 402, 403 tuned to capture light of a different color component (e.g., red, green, blue). Sensor elements 401, 402, 403 may also be referred to as photodetectors in one embodiment. Exemplary sensor elements 401, 402, 403 comprise CMOS devices of a Foveon image sensor. FIG. 4A shows an individual pixel (e.g., blue pixel 312) resulting from the offset of red, green, and blue color sensor arrays 302, 304, and 306, respectively, of a multi-layered image sensor 208 are shown. Typically, the plurality of sensor elements or light sensing elements of an image sensor define the pixels and resolution of the image sensor. According to some embodiments herein, the arrays 302, 304, 306 may be offset with respect to one another. Accordingly, a given sensor may define a pixel for a given array but not for pixels of other arrays. For convenience, pixels or pixel locations may be defined by sensor elements of one of the arrays (e.g., blue) and the sub-pixels for a given pixel or pixel location may be defined using a plurality of the sensor elements of the other arrays corresponding to the given pixel or pixel location as shown in FIG. 4A. FIG. 4A depicts the arrays 302, 304, 306 offset in an "x" direction. Arrays 302, 304, 306 may be also offset in a "z" direction (not shown in FIG. 4A).

FIG. 4B shows another embodiment of the present invention where an image shift of an incoming image is performed in an image sensor 208a. For example, instead of physically shifting the color sensor arrays 302, 304, 306 to arrange image sensor elements (e.g., 401, 402, 403) in a spatially offset manner, the offset may be implemented using an optical device, such as, for example, a prism 404, located in an optical path of a device (e.g., within optics 210 of device 102) such that peaks of R, G, and B components of light are dispersed by a predetermined offset along the diagonal. For example, the R, G, and B components may each be offset by ⅓ of a pixel along a diagonal (or other desired offset). Thus, when an incoming image is captured using the arrangement shown in FIG. 4B and using full color image sensors (e.g., image sensor elements capable of measuring red, green, and blue color components at individual pixel locations), each color channel of each image sensor corresponds to a different location on the image. In one embodiment, the processing circuitry 122 (FIG. 2) may be configured to implement color demosaicing to provide additional color information. A high resolution image may be generated using equations (1)-(5) as described below.

FIG. 5 shows sub-pixel details of an individual pixel. For example, blue pixel 312 includes individual sub-pixels $312_1$-$312_9$, each sub-pixel having a unique combination of R, G, and B color components in one embodiment. Intensity values of the R, G, and B components of the sub-pixels $312_1$-$312_9$ may be determined using image sensor elements of the various pixels of the color sensor arrays 302, 304, 306 the overlapping of which produced the sub-pixels $312_1$-$312_9$. For example, consider the R, G, and B arrays 302, 304, 306 as being configured as 4×6 arrays (i.e., 4 rows and 6 columns) and overlapped and in a manner as shown in FIG. 3A. For this exemplary case, intensity of the red component of sub-pixel $312_1$ may be determined using the overall intensity of the red pixel ($R_{4\times1}$) corresponding to row 4 and column 1 of the red color sensor array 302 (FIG. 3A). Likewise, intensity of the green component for the sub-pixel $312_1$ may be determined using the overall intensity of the green pixel ($G_{4\times1}$) corresponding to row 4 and column 1 of the green color sensor array 304 (FIG. 3A), and intensity of the blue component may be determined using the overall intensity of the blue pixel ($B_{4\times1}$) corresponding to row 4 and column 1 of the blue sensor array 306 (FIG. 3A).

The overall intensity values of each pixel (e.g., red 308, green 310, blue 312) of a color sensor array (e.g., red array 302, green array 304, blue array 306 shown in FIG. 3A) may be measured by determining a physical location of a pixel in a color sensor array and reading an intensity value corresponding to the determined pixel location directly from elements of sensor 208 (FIG. 2).

In one embodiment, consider, for example, each individual pixel (red 308, green 310, blue 312) comprises a plurality of sub-pixels (e.g., individual pixels may comprise 9 sub-pixels in the described embodiment) and the individual pixels may comprise a sum of the respective sub-pixels. In accordance with the described embodiment, a sum of intensities of the sub-pixels is equal to an intensity of the individual respective pixel having such sub-pixels.

For purposes of simplicity, an exemplary methodology for determining sub-pixel intensities is described with respect to blue pixel 312 having, for example, nine sub-pixels $312_1$-$312_9$. Such methodology may be used for determining sub-pixel intensities of other pixels (e.g., red, green) of an array.

As a starting point of the described example, respective intensities ($I_{B1}, I_{B2} \ldots I_{B9}$) of sub-pixels $312_1$-$312_9$ may be set to be equal to ⅑$^{th}$ of overall intensity $I_B$ of blue pixel 312. This may be further refined by assuming that the color of the sub-pixels (e.g., $312_1$-$312_9$) is the same as the color of the full pixel (e.g., blue pixel 312) in which the sub-pixels reside. New intensity values for individual sub-pixels (e.g., $312_1$-

$312_9$) may be determined using equation (1) that adjusts sub-pixel intensities $I_{B1}, I_{B2} \ldots I_{B9}$ to agree with the above-noted assumption while maintaining the sum of intensities of the sub-pixels (e.g., $312_1$-$312_9$) equaling the intensity of the respective pixel (e.g., 312) having the sub-pixels. That is, $I_B = I_{B1} + I_{B2} \ldots + I_{B9}$, where $I_B$ is the intensity of blue pixel 312, and $I_{B1}, I_{B2} \ldots I_{B9}$ are intensities of sub-pixels (e.g., $312_1$-$312_9$) comprised in blue pixel 312.

Since individual sub-pixels $312_1$-$312_9$ also include green components (e.g., $G_1, G_2, \ldots G_9$) and red components (e.g., $R_1, R_2, \ldots R_9$), intensities of a sub-pixel $312_1$ may be determined as follows:

$$B_1 = (R_1 + G_1) * (\text{mean}(B) / (\text{mean}(R) + \text{mean}(G)))$$

$$R_1 = (B_1 + G_1) * (\text{mean}(R) / (\text{mean}(B) + \text{mean}(G))) \qquad \text{Equation 1}$$

$$G_1 = (R_1 + B_1) * (\text{mean}(G) / (\text{mean}(R) + \text{mean}(B)))$$

wherein the mean R, G, B values correspond to the mean of all of the red, green, and blue pixels in the respective red, green, and blue arrays 302, 304, and 306, respectively.

However, each sub-pixel (e.g., $312_1$-$312_9$) may reside in three different overlapping full pixels (e.g., red 308, green 310, blue 312), and equation (1) may not simultaneously adjust sub-pixel intensities for all three overlapping full pixels at the same time.

The above equations may, however, be iteratively applied to refine the sub-pixel intensity values such that overall stress S is minimized. The overall stress is defined as:

$$S = \Sigma \cdot S_{i,j} \qquad \text{Equation 2}$$

stress $S_{i,j}$ may be defined as:

$$S_{i,j} = (\overline{R}_{i,j} - \hat{R}_{i,j})^2 + (\overline{G}_{i,j} - \hat{G}_{i,j})^2 + (\overline{B}_{i,j} - \hat{B}_{i,j})^2 \qquad \text{Equation 3}$$

where $\overline{R}, \overline{G}$, and $\overline{B}$ are average colors of sub-pixels in the neighborhood of an individual sub-pixel $R_{u,v}, G_{u,v}, B_{u,v}$, respectively, and $\hat{R}, \hat{G}$, and $\hat{B}$ are intensities of sub-pixels within individual pixels, and defined by the following equations:

$$R_{x,y} = \sum_{i=3x}^{3x+2} \sum_{j=3y}^{3y+2} \hat{R}_{i,j} \qquad \text{Equation 4}$$

$$G_{x,y} = \sum_{i=3x+1}^{3x+3} \sum_{j=3y+1}^{3y+3} \hat{G}_{i,j}$$

$$B_{x,y} = \sum_{i=3x+2}^{3x+4} \sum_{j=3y+2}^{3y+4} \hat{B}_{i,j}$$

$$\overline{R}_{i,j} = \frac{1}{9} \sum_{u=i-1}^{i+1} \sum_{v=j-1}^{j+1} \hat{R}_{u,v} \qquad \text{Equation 5}$$

$$\overline{G}_{i,j} = \frac{1}{9} \sum_{u=i-1}^{i+1} \sum_{v=j-1}^{j+1} \hat{G}_{u,v}$$

$$\overline{B}_{i,j} = \frac{1}{9} \sum_{u=i-1}^{i+1} \sum_{v=j-1}^{j+1} \hat{B}_{u,v}$$

where $R_{x,y}, G_{x,y}$, and $B_{x,y}$ represent the intensity values of the red, green, and blue pixels corresponding to row x and column y of red array 302, green array 304, and blue array 306, and $R_{i,j}, G_{i,j}, B_{i,j}$ represent the intensity values of the red, green, and blue components of the sub-pixels within individual pixels (e.g., numerals 308, 310, 312 of FIG. 3A) of color sensor arrays (e.g., numerals 302, 304, 306 of FIG. 3A).

Referring again to FIG. 3A, from the measured intensity values of the $R_{4\times 1}, G_{4\times 1}$, and $B_{4\times 1}$ pixels, sub-pixel intensity values of red, green, and blue components of sub-pixels of an individual pixel (e.g., blue pixel 312) may be determined using a demosaicing algorithm, such as, for example, a method described in "Demosaicing: Image Reconstruction from Color CCD Samples" by Ron Kimmel, IEEE Trans. On Image Processing, 8(9): 1221-8, September 1999, the teachings of which are incorporated herein by reference. For example, the read pixel intensity data may be inputted to Kimmel's demosaicing method to obtain sub-pixel intensity values for the RGB components for the sub-pixels. Other methods for determining the sub-pixel intensities are possible.

FIG. 6 is a flow chart of an exemplary methodology to determine sub-pixel intensities in one embodiment. The methodology may be implemented using hardware or programming (e.g., software or firmware). In the described embodiment, processing circuits 122 or 222 implement the depicted methodology. Other embodiments are possible including more, less, or alternative steps, or using other hardware or programming configurations. The appropriate processing circuitry (e.g., 122 or 222) receives overall intensity for individual pixels (e.g., 308, 310, 312) of the color sensor arrays (e.g., 302, 304, 306) of the image sensor 208 at a step 602.

At a step 604, an assumption is made by the processing circuitry that an individual pixel has a constant local color in order to approximate intensities of the sub-pixels using predetermined initial intensity values of sub-pixels in one embodiment. The processing circuitry determines the sub-pixel intensities according to the equations (1) through (5) described above.

At a step 606, the processing circuitry queries if more sub-pixels requiring determination of sub-pixel intensities are present. If yes, the process proceeds to perform step 604 for the sub-pixels.

FIG. 7 shows another embodiment of the invention wherein an image of increased resolution (e.g., a high resolution image including sub-pixel data) determined by the processing circuitry 122 or 222, using the overall intensities of individual pixels of the color sensor arrays as mentioned above, is projected onto a display device 708 (e.g., CRT). For example, assume that the image of the increased resolution (e.g., high resolution image) has nine times (9×) as many pixels as a projector 704 can generate. The high-resolution image may be downsampled using processor 702 in order to obtain R, G, and B color components but with three different offsets corresponding to the offsets that are used to create the increased resolution image, thus producing R, G, and B color components with each color component shifted by a ⅓ of a pixel on the diagonal in one example. The resulting image may be projected using the projector 704 through a prism 706 onto the display device 708. The prism 706 is configured to perform an inverse spatial offset of each color component of the image to display a high-resolution image corresponding to the increased resolution image. This arrangement enables displaying a high-resolution image using a low-resolution projector (e.g., by configuring the low-resolution projector into a high-resolution projector by splitting the R, G, B color components such that each color component provides a separate resolution position).

Figure 8:
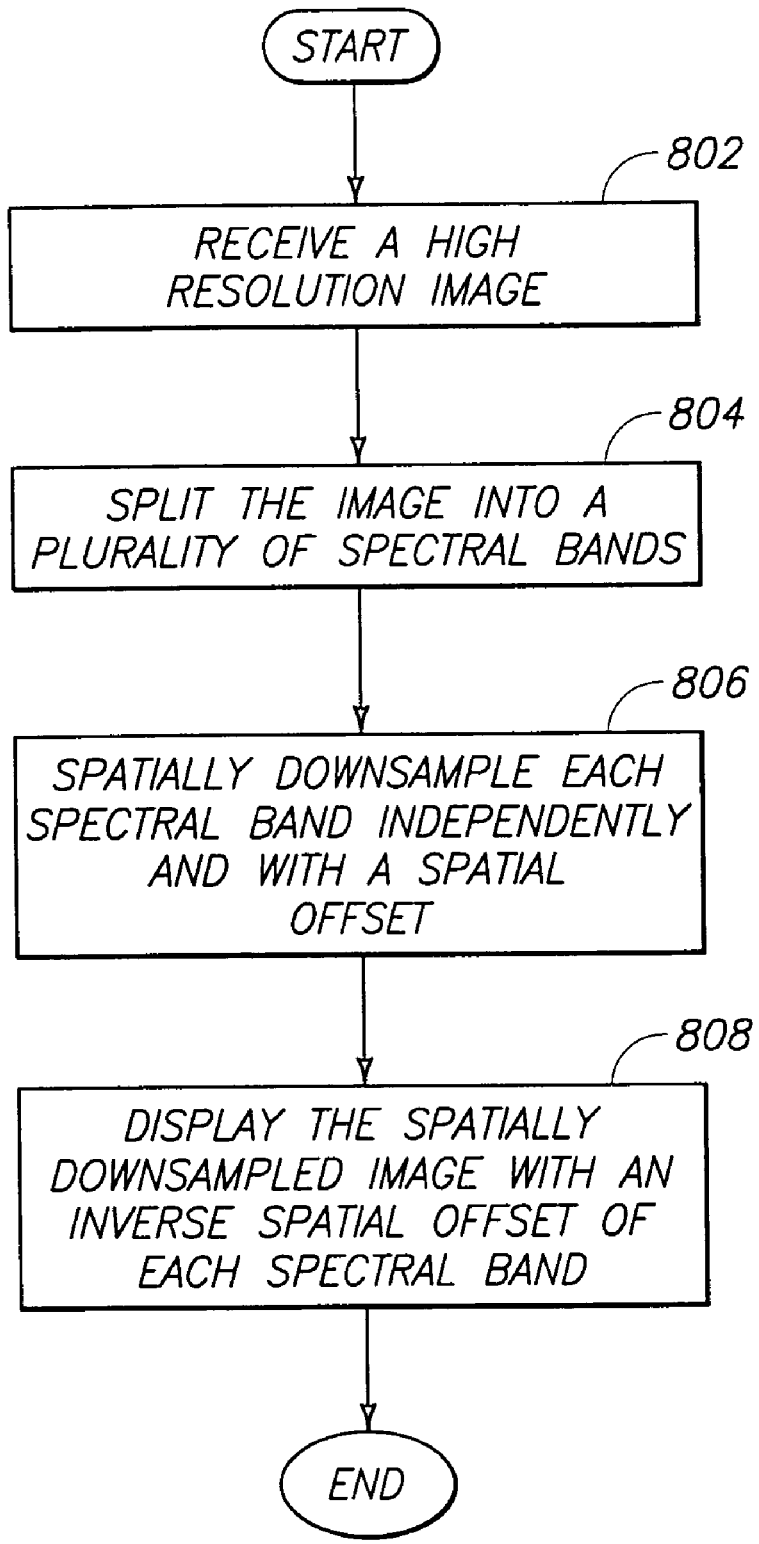
FIG. 8 is an exemplary methodology corresponding to FIG. 7 according to one embodiment.

FIG. 8 is an exemplary methodology to implement the embodiment shown in FIG. 7. The methodology may be implemented using hardware or programming (e.g., software or firmware).

Referring again to FIG. 8, a high resolution image is received in a processor 702 at a step 802. In one PC graphics example, one may set the PC resolution to be 9 times the display resolution. For DVD projectors, the display could be chosen to have ⅑ the full resolution of DVD video. For fixed resolution bitmaps, the bitmap could be resampled to have 9 times the projector resolution.

At a step 804, the high resolution image is split into two or more spectral bands by appropriate optics assembly (e.g., into red, green, and blue bands). A dichroic prism assembly produced by Canon, Inc. and used in projectors such as for example LV7525, manufactured by Canon, Inc., may be used to split the light into multiple spectral bands.

At a step 806, the processor 702 downsamples the received high resolution image for R, G, and B color components with three different offsets, thus producing R, G, and B color components with each color component shifted by a predetermined distance (e.g., ⅓ of a pixel) on the diagonal. The downsampled images are split into R, G, and B color components so that each color provides a separate resolution position.

At a step 808, the spatially downsampled images are displayed, with an inverse spatial offset of each spectral band, on a display device. The inverse spatial offset may be achieved, for example, using a prism. It will, however, be appreciated that other optical components may also be used.

The protection sought is not to be limited to the disclosed embodiments, which are given by way of example only, but instead is to be limited only by the scope of the appended claims.

What is claimed is:

1. An imaging apparatus comprising:
   an optical device configured to receive light and to provide a plurality of color components of the received light;
   an image sensor including:
      a plurality of color sensor arrays arranged elevationally over one another and configured to receive respective ones of the color components, and the color sensor arrays individually comprising a plurality of sensors configured to provide image data for a plurality of pixels of a respective one of the color components at an initial resolution; and
      a processing mechanism,
      wherein the plurality of color sensor arrays overlap and are offset with respect to one another to define a plurality of sub-pixels for individual ones of the pixels; and
   processing circuitry configured to access the image data for pixels from each of the plurality of color sensor arrays, and using the accessed image data, to determine sub-pixel image data for the respective sub-pixels to form an image of an increased resolution compared with the initial resolution of the color sensor arrays,
      wherein a given pixel of the pixels has a given sub-pixel having a plurality of red components including a given red component, a plurality of green components including a given green component, and a plurality of blue components including a given blue component,
      and wherein the processing mechanism is to generate:
         a blue intensity of the given sub-pixel based on a mean of the blue components multiplied by a sum of the given red component and the given green component, and divided by a sum of a mean of the red components and a mean of the green components,
         a red intensity of the given sub-pixel based on a mean of the red components multiplied by a sum of the given blue component and the given green component, and divided by a sum of a mean of the blue components and a mean of the green components, and
         a green intensity of the given sub-pixel based on a mean of the green components multiplied by a sum of the given red component and the given blue component, and divided by a sum of a mean of the red components and a mean of the blue components.

2. The imaging apparatus of claim 1, wherein the arrays comprise a plurality of photodetectors at individual pixels to detect respective color components of light.

3. The imaging apparatus of claim 1, wherein each of the sub-pixels comprise red, green, and blue color components, and the plurality of color sensor arrays comprise red, blue, and green color sensor arrays.

4. The imaging apparatus of claim 3, wherein overlapping of the red, green, and blue color sensor arrays enables determination of the image data at an increased number of physical locations within the individual ones of the pixels to create an image of a higher resolution at a sub-pixel level.

5. The imaging apparatus of claim 1, wherein the increased resolution image is created by determining sub-pixel image data for individual pixels using the image data from each of the plurality of color sensor arrays.

6. The imaging apparatus of claim 1, wherein the offsetting of the color sensor arrays is performed by physically shifting the plurality of color sensor arrays in a desired direction.

7. The imaging apparatus of claim 1, wherein the optical device is configured to output the color components in a direction which is the same as a direction of travel of the received light.

8. The imaging apparatus of claim 1, wherein the optical device is a prism.

9. The imaging apparatus of claim 1, wherein the color sensor arrays are configured in an offset arrangement with respect to one another and with respect to a direction of travel of the received light.

10. An imaging apparatus comprising:
   an image sensing means implemented as a single device, and including:
      a plurality of color sensor arrays, individual sensor arrays comprising a plurality of sensor means for providing image data for a plurality of pixels of a respective color component at an initial resolution;
      wherein individual ones of the sensor arrays are arranged elevationally over one another in a layered stack of the image sensing means for individually detecting red, green, and blue components of light, respectively;
      wherein the plurality of sensor means of respective color sensor arrays are arranged in an offset relationship with respect to one another in the single device for defining a plurality of sub-pixels for individual ones of the pixels; and
      processing means for accessing the image data for at least one pixel from each of the plurality of color sensor arrays, and using the accessed image data, to form an image of an increased resolution compared with the initial resolution of the color sensor arrays,
      wherein a given pixel of the pixels has a given sub-pixel having a plurality of red components including a given red component, a plurality of green components including a given green component, and a plurality of blue components including a given blue component,
      and wherein the processing means is for generating:
         a blue intensity of the given sub-pixel based on a mean of the blue components multiplied by a sum of the given red component and the given green component, and divided by a sum of a mean of the red components and a mean of the green components, a red intensity of the given sub-pixel based on a mean of the red components multiplied by a sum of the given blue component and the given green component, and divided by a sum of a mean of the blue components and a mean of the green components, and a green intensity of the given sub-pixel based on a mean of the green components multiplied by a sum of the given red component and the given blue component, and divided by a sum of a mean of the red components and a mean of the blue components.

11. The imaging apparatus of claim 10, wherein the offset is achieved by a shift of layers of the sensor means in the image sensing means.

12. The imaging apparatus of claim 10, wherein the sensor means are offset in a depthwise direction with respect to a direction of received light.

13. The imaging apparatus of claim 10, wherein the processing means comprises means for determining the sub-pixel image data for the respective sub-pixels of an individual pixel using the accessed image data of the respective individual pixel, and the processing means further comprises means for forming an image of the increased resolution.

14. An image data processing method comprising:
providing image data using an image sensor, and the providing comprising:
receiving light travelling in a direction using an optical device;
using the optical device, providing the light into a plurality of light components corresponding to different wavelengths of the light and outputting individual ones of the light components in the same direction of travel of the received light;
receiving the light components using a plurality of color sensor arrays of the image sensor, wherein the color sensor arrays have an initial resolution;
generating image data using the color sensor arrays; and
accessing the image data from each of the plurality of color sensor arrays; and
forming an image having an increased resolution compared with the initial resolution of the color sensor arrays using the accessed image data,
wherein a given pixel of the image data has a given sub-pixel having a plurality of red components including a given red component, a plurality of green components including a given green component, and a plurality of blue components including a given blue component,
and wherein forming the image comprises generating:
a blue intensity of the given sub-pixel based on a mean of the blue components multiplied by a sum of the given red component and the given green component, and divided by a sum of a mean of the red components and a mean of the green components,
a red intensity of the given sub-pixel based on a mean of the red components multiplied by a sum of the given blue component and the given green component, and divided by a sum of a mean of the blue components and a mean of the green components, and a green intensity of the given sub-pixel based on a mean of the green components multiplied by a sum of the given red component and the given blue component, and divided by a sum of a mean of the red components and a mean of the blue components.

15. The method of claim 14, wherein the forming comprises:
determining sub-pixel image data from the accessed image data, and using the sub-pixel image data to form the image having increased resolution.

16. The method of claim 14, wherein the image having increased resolution is formed at a sub-pixel level.

17. The method of claim 14, wherein the color sensor arrays overlap and are offset with respect to one another in the direction of travel of the received light.

18. The method of claim 14, wherein the optical device is a prism.

19. The method of claim 14, wherein the optical device is a lens.

20. An article of manufacture comprising:
a processor-usable medium comprising processor-usable code configured to cause processing circuitry to perform processing comprising:
accessing image data for at least one pixel from each of a plurality of color sensor arrays at an initial resolution; and
forming an image of increased resolution, compared with the initial resolution of individual ones of the color sensor arrays, using the accessed image data, wherein the color sensor arrays are offset with respect to one another providing a plurality of image data values for at least one color component for a single pixel location and wherein a sum of the image data values comprising intensity values for a single color component for the single pixel location are equal to an intensity value of the accessed image data for the single color component for the single pixel location,
wherein a given pixel of the image data has a given sub-pixel having a plurality of red components including a given red component, a plurality of green components including given green component, and a plurality of blue components including a given blue component,
and wherein forming the image comprises generating:
a blue intensity of the given sub-pixel based on a mean of the blue components multiplied by a sum of the given red component and the given green component, and divided by a sum of a mean of the red components and a mean of the green components,
a red intensity of the given sub-pixel based on a mean of the red components multiplied by a sum of the given blue component and the given green component, and divided by a sum of a mean of the blue components and a mean of the green components, and
a green intensity of the given sub-pixel based on a mean of the green components multiplied by a sum of the given red component and the given blue component, and divided by a sum of a mean of the red components and a mean of the blue components.

* * * * *